(12) United States Patent
Zhang et al.

(10) Patent No.: US 11,301,476 B2
(45) Date of Patent: Apr. 12, 2022

(54) USING IN-STORAGE COMPUTATION TO IMPROVE THE PERFORMANCE OF HASH JOIN FOR DATABASE AND DATA ANALYTICS

(71) Applicant: ScaleFlux, Inc., San Jose, CA (US)

(72) Inventors: Tong Zhang, Albany, NY (US); Yang Liu, Milpitas, CA (US); Fei Sun, Irvine, CA (US); Hao Zhong, Los Gatos, CA (US)

(73) Assignee: SCALEFLUX, INC., San Jose, CA (US)

( * ) Notice: Subject to any disclaimer, the term of this patent is extended or adjusted under 35 U.S.C. 154(b) by 295 days.

(21) Appl. No.: 16/513,805

(22) Filed: Jul. 17, 2019

(65) Prior Publication Data

US 2020/0034361 A1  Jan. 30, 2020

Related U.S. Application Data

(60) Provisional application No. 62/703,810, filed on Jul. 26, 2018.

(51) Int. Cl.
*G06F 16/00* (2019.01)
*G06F 16/2455* (2019.01)
*G06F 16/215* (2019.01)
*G06F 16/22* (2019.01)

(52) U.S. Cl.
CPC ........ *G06F 16/2456* (2019.01); *G06F 16/215* (2019.01); *G06F 16/2255* (2019.01)

(58) Field of Classification Search
CPC . G06F 16/215; G06F 16/2255; G06F 16/2456
See application file for complete search history.

(56) References Cited

U.S. PATENT DOCUMENTS

| | | | | |
|---|---|---|---|---|
| 2009/0281985 | A1* | 11/2009 | Aggarwal | G06F 16/283 |
| 2010/0293135 | A1* | 11/2010 | Candea | G06F 16/2453 707/602 |
| 2013/0318067 | A1* | 11/2013 | Sukhwani | G06F 16/2456 707/714 |
| 2014/0214796 | A1* | 7/2014 | Barber | G06F 16/24544 707/714 |

(Continued)

*Primary Examiner* — Diedra McQuitery
(74) *Attorney, Agent, or Firm* — Hoffman Warnick LLC

(57) ABSTRACT

A method according to embodiments includes: storing an entire hash table of a table R in memory of a computational storage device; storing a second table S in storage media of the computational storage device, the table R being smaller than the table S, wherein the hash JOIN operation is directed to combining a $c_s$-th column in the table S and a $c_r$-th column in the table R; wherein, for each row of the table S, the computational storage device configured to perform a method, including: applying a hash function to a value of the $c_s$-th column to provide a hash result; looking up the hash result in the hash table stored in the memory of the computational storage device; and if the hash result is found, sending the row of the table S and a corresponding row index of the table R to the host computing system.

8 Claims, 5 Drawing Sheets

(56) References Cited

U.S. PATENT DOCUMENTS

2017/0024435 A1\* 1/2017 Kociubes ............ G06F 16/2453
2017/0031976 A1\* 2/2017 Chavan .................. G06F 16/23
2018/0004809 A1\* 1/2018 Ramesh ............ G06F 16/24544
2018/0089261 A1\* 3/2018 Li ....................... G06F 16/2456

\* cited by examiner

US 11,301,476 B2

USING IN-STORAGE COMPUTATION TO IMPROVE THE PERFORMANCE OF HASH JOIN FOR DATABASE AND DATA ANALYTICS

TECHNICAL FIELD

The present invention relates to database and data analytics, and particularly to utilizing computational storage devices to accelerate database and data analytics.

BACKGROUND

Used to combine columns from multiple tables, JOIN is one of the most important and heavy-duty operations in almost all database and data analytics systems. Hence, it is highly desirable to improve the implementation efficiency of JOIN. Hash JOIN is one of the most widely used JOIN algorithms that implement the JOIN operation. The basics of the hash JOIN algorithm is described as follows. Suppose one wants to join two tables S and R, where the size of table S is larger than the size of table R. Using the hash JOIN algorithm, one first builds a hash table of the smaller table R. Each hash table entry contains one value of the column based upon which the JOIN is performed and its corresponding row index. Once the hash table is built, one scans the larger table S and finds the relevant rows from the smaller table R by looking up the hash table. In current practice, the entire table S must be first loaded from the underlying storage devices into host memory, and a CPU of the host must scan each row of the table S. As a result, storage I/O traffic and CPU usage are linearly proportional to the size of the table S.

SUMMARY

Accordingly, embodiments of the present disclosure are directed to the utilization of computational storage devices to reduce the I/O traffic and CPU usage for implementing hash JOIN.

A first aspect of the disclosure is directed to a method for enhancing a hash JOIN operation, including: storing an entire hash table of a table R in a memory of a computational storage device; storing a second table S in storage media of the computational storage device, wherein the table R is smaller than the table S, and wherein the hash JOIN operation is directed to combining a $c_s$-th column in the table S and a $c_r$-th column in the table R; wherein, for each row of the table S, the computational storage device is configured to perform a method, including: applying a hash function to a value of the $c_s$-th column to provide a hash result; looking up the hash result in the hash table stored in the memory of the computational storage device; and if the hash result is found in the hash table, sending the row of the table S and a corresponding row index of the table R to the host computing system.

A second aspect of the disclosure is directed to a method for enhancing a hash JOIN operation, including: storing a Bloom filter of a table R in a memory of a computational storage device; storing a second table S in storage media of the computational storage device, wherein the table R is smaller than the table S, and wherein the hash JOIN operation is directed to combining a $c_s$-th column in the table S and a $c_r$-th column in the table R; wherein, for each row of the table S, the computational storage device is configured to perform a method, including: applying a hash function to a value of the $c_s$-th column to provide a hash result; looking up the hash result in the Bloom filter stored in the memory of the computational storage device; and if the hash result is found in the Bloom filter, sending the row of the table S and a corresponding row index of the table R to the host computing system.

A third aspect of the disclosure is directed to a computational storage device, including: a memory for storing an entire hash table of a table R; storage media for storing a second table S, wherein the table R is smaller than the table S, and wherein the hash JOIN operation is directed to combining a $c_s$-th column in the table S and a $c_r$-th column in the table R; a computation module, including: a hash engine for applying, for each row in the table S, a hash function to a value of the $c_s$-th column to provide a hash result; and a hash table look-up engine for looking up the hash result in the hash table stored in the memory of the computational storage device; and a communication module for sending the row of the table S and a corresponding row index of the table R to the host computing system if the hash result is found in the hash table, wherein the host computing system is configured to perform a hash JOIN based on the rows of the table S and the row indices of the table R received from the computational storage device.

A fourth aspect of the disclosure is directed to computing system for performing a hash JOIN operation, including: a host computing device; a computational storage device coupled to the host computing device, the computational storage device including: a memory for storing a Bloom filter of a table R in a memory of a computational storage device; storage media for storing a second table S, wherein the table R is smaller than the table S, and wherein the hash JOIN operation is directed to combining a $c_s$-th column in the table S and a $c_r$-th column in the table R; a computation module, including: a hash engine for applying, for each row in the table S, a hash function to a value of the $c_s$-th column to provide a hash result; and a Bloom filter look-up engine for looking up the hash result in the Bloom filter stored in the memory of the computational storage device; and a communication module for sending the row of the table S and a corresponding row index of the table R to the host computing system if the hash result is found in the Bloom filter.

BRIEF DESCRIPTION OF THE DRAWINGS

The numerous advantages of the present disclosure may be better understood by those skilled in the art by reference to the accompanying figures.

DETAILED DESCRIPTION

Reference will now be made in detail to embodiments of the disclosure, examples of which are illustrated in the accompanying drawings.

Figure 1:
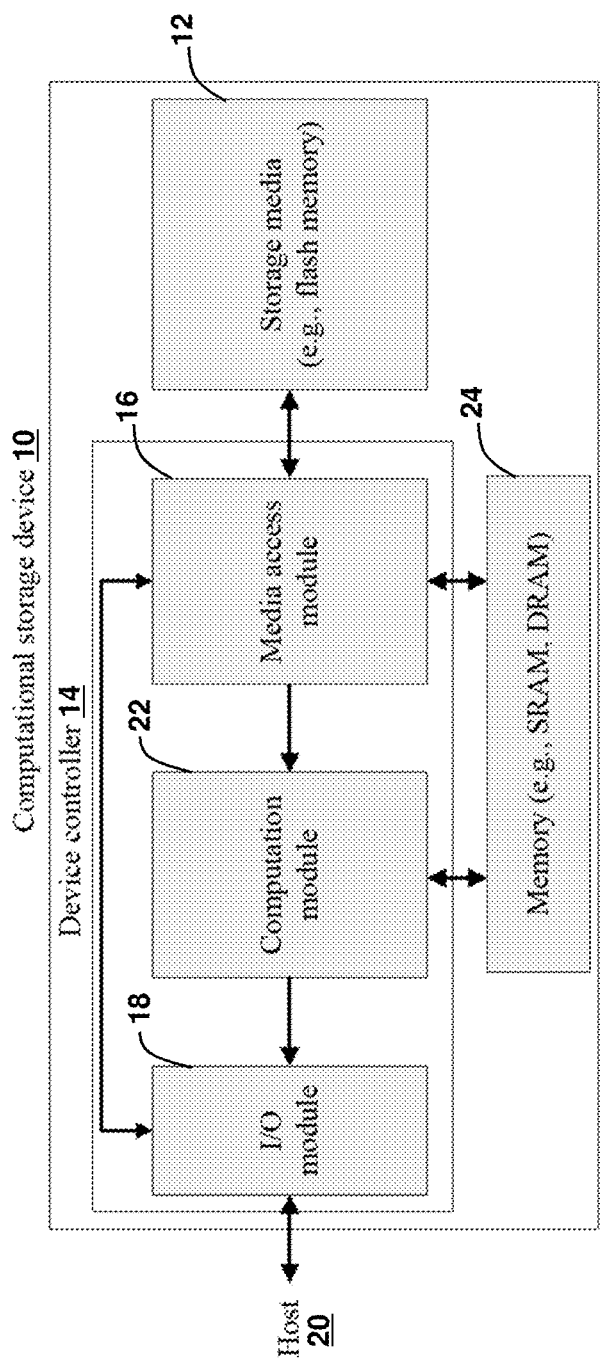
FIG. 1 illustrates the architecture of a computational storage device according to embodiments.

According to embodiments, computational storage devices are used to reduce the I/O traffic and CPU usage for the implementation of hash JOIN. An example of the architecture of a computational storage device 10 is depicted in FIG. 1. As shown, the computational storage device 10 includes storage media 12 (e.g., flash memory, non-volatile memory, hard disk, etc.) and a device controller 14. The device controller 14 includes a media access module 16 that carries out all the necessary operations to ensure high-performance and reliable data read/write from/to the storage media 12, and an I/O (e.g., communication) module 18 that handles the interfacing with a host 20 (e.g., a host computing system). The device controller 12 of the computational storage device 10 also includes a computation module 22, which can carry out certain fixed or programmable computational tasks.

In the computational storage device 10, after the media access module 16 reads data from the storage media 12, the data may be directly sent back to the host 20 without further processing, or the data may be further processed by the computation module 22, with the results of the computation sent back to the host 20. To facilitate the in-storage computation, the computational storage device 10 includes a certain amount of memory 24 (e.g., SRAM or DRAM) that may be used by the computation module 22 and media access module 16.

Figure 2:
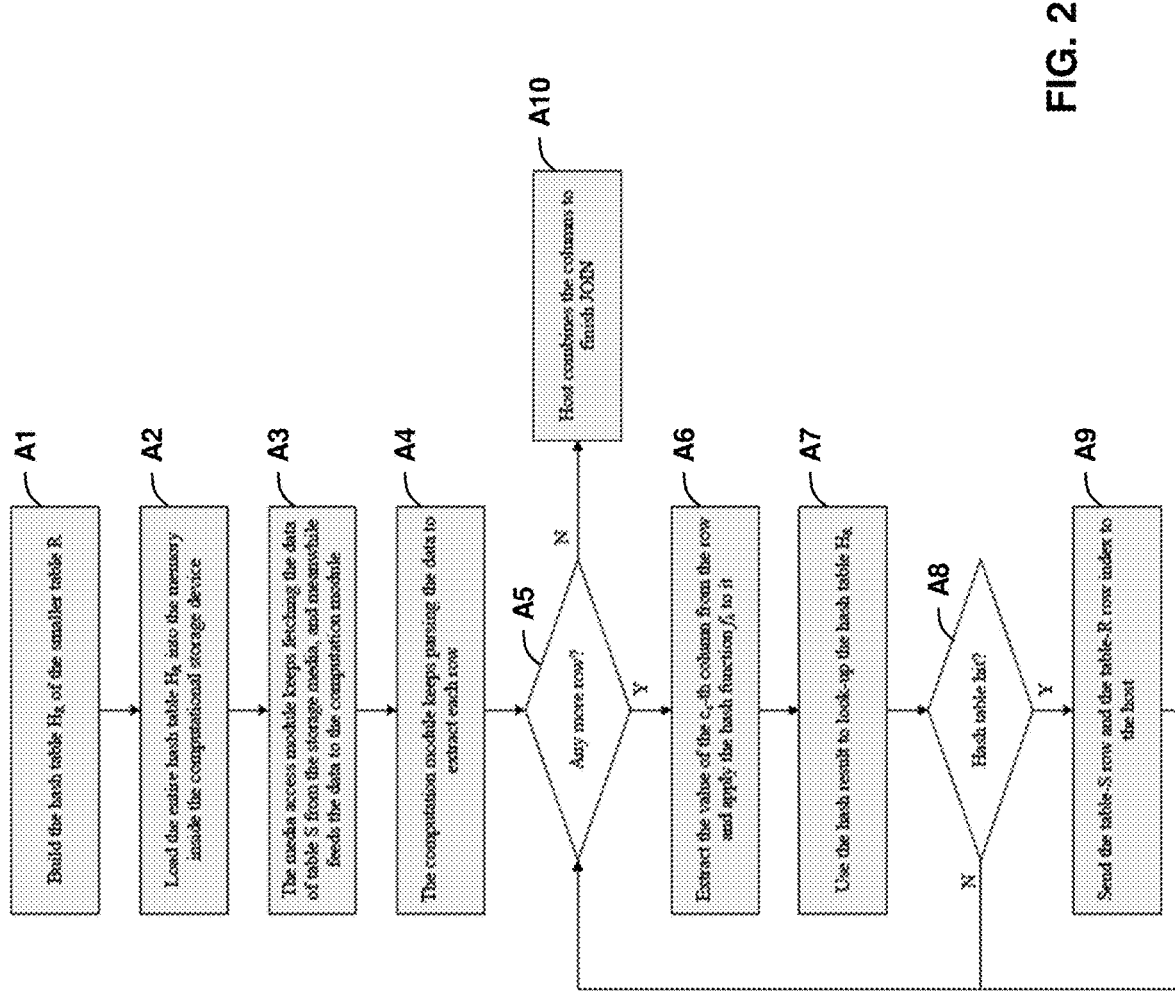
FIG. 2 illustrates an operational flow diagram of a process for using a computational storage device to facilitate hash JOIN when an entire hash table is stored in the memory of the computational storage device according to embodiments.
Figure 3:
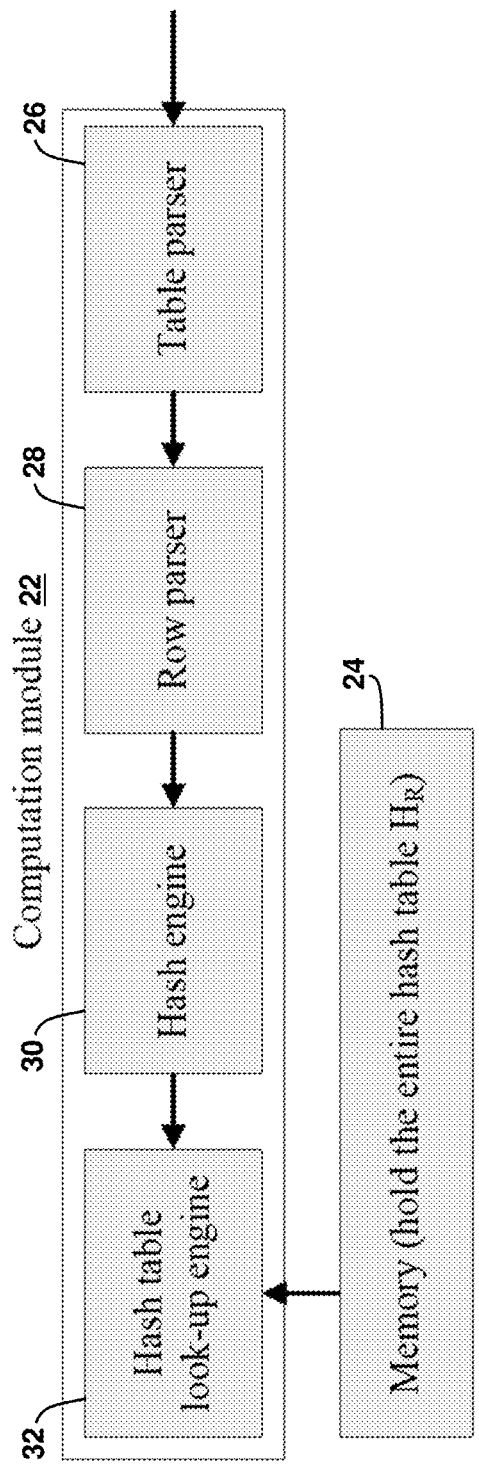
FIG. 3 illustrates the configuration of a computation module of a computational storage device when an entire hash table is stored in the memory of the computational storage device according to embodiments.

FIG. 2 illustrates an operational flow diagram of a process for using the computational storage device 10 to facilitate hash JOIN when an entire hash table can be stored in the memory 24 of the computational storage device 10. FIG. 3 shows the corresponding configuration of the computation module 22 of the computational storage device 10. FIGS. 1-3 will be referred to simultaneously. In the following discussion, it is assumed that a hash JOIN is to be applied on two tables S and R, that the size of table R is less than the size of table S, and that the host 20 has downloaded the table S to the storage media 12. It is further assumed that the JOIN aims to combine columns based on the $c_s$-th column in table S and $c_r$-th column in table R.

According to the hash JOIN algorithm, at process A1, a hash table $H_R$ is first built using a hash function $f_h$, based upon the smaller table R. At process A2, the entire hash table $H_R$ is loaded into the memory 24 of the computational storage device 10. The hash table $H_R$ may be built by the host 20, the computational storage device 10, or may be provided in any other suitable manner.

At process A3, the media access module 16 of the device controller 14 fetches the data of table S from the storage media 12, and feeds the data to the computation module 22 of the device controller 14. While receiving data from the media access module 16, at process A4, a table parser 26 of the computation module 22 parses the data to extract each row in the table S. For each row in the table S (Y at process A5), at process A6, a row parser 28 of the computation module 22 extracts the value of the $c_s$-th column from the row, and a hash engine 30 of the computation module 22 applies the hash function $f_h$ to the extracted value. At process A7, for the i-th row in the table S, a hash table look-up engine 32 of the computation module 22 looks up the hash result obtained at process A6 against the hash table $H_R$ stored in the memory 24. If the hash result for the i-th row in the table S matches the j-th row in the table R (Y at process A8), the device controller 14 sends the i-th row in the table S plus the row index j in the table R to the host 20 at process A9. If the i-th row in the table S does not match any row in the table R (N at process A8) (i.e., the i-th row in table S will not participate in the JOIN operation), the device controller 14 simply discards the i-th row of the table S. If there are no more rows in the table S (N at process A5), at process A10, the host 20 combines the columns to finish the JOIN operation.

By discarding the i-th row of the table S if the i-th row in the table S does not match any row in the table R, the device controller 14 of the computational storage device 10 internally filters out all the rows in the table S that will not participate the JOIN. This can significantly reduce I/O data traffic. Further, since all of the hashing and hash table look-up operations are completely handled by the computation module 22 of the computational storage device 10, CPU usage of the host 20 for implementing hash JOIN is greatly reduced.

Figure 4:
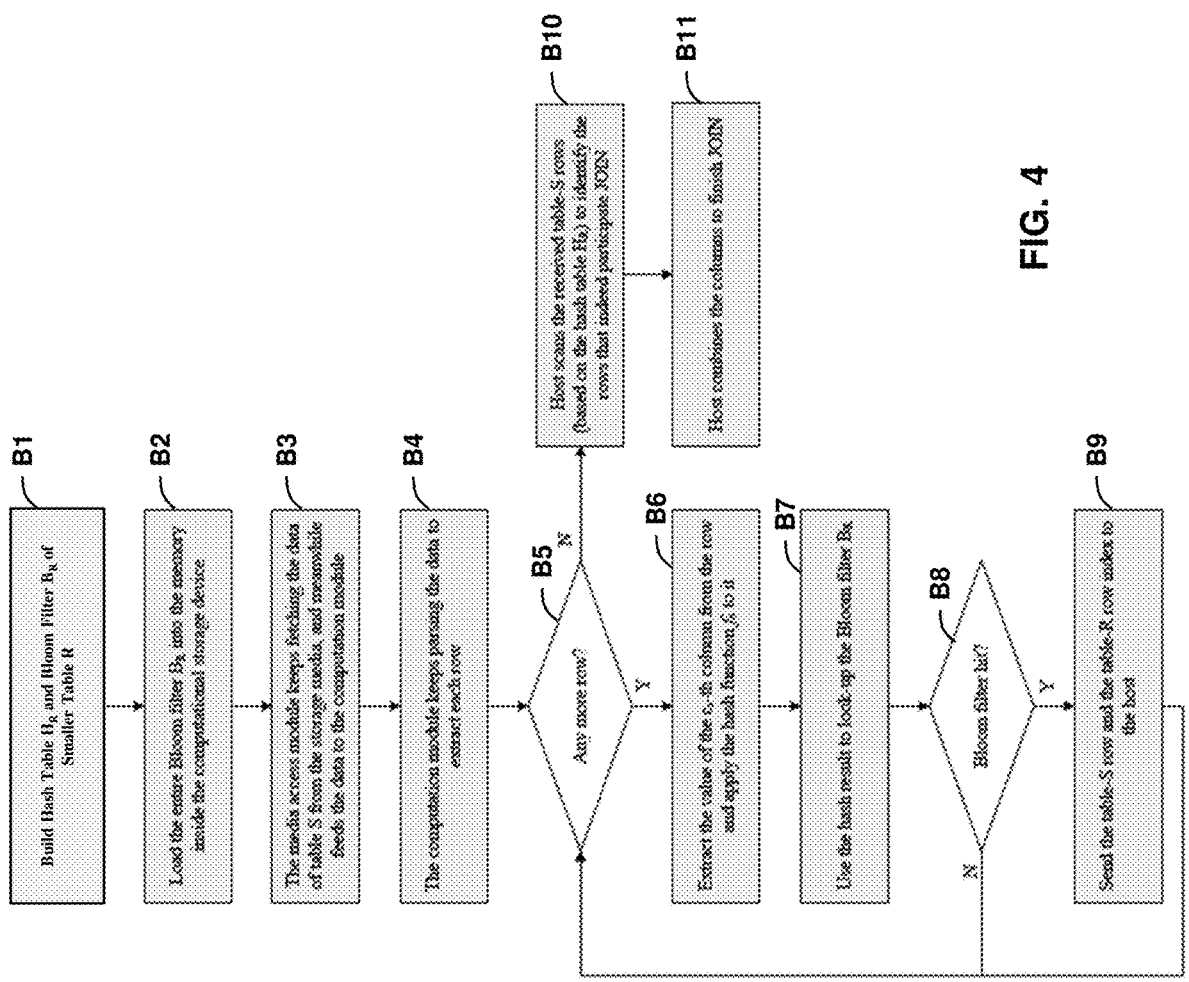
FIG. 4 illustrates an operational flow diagram of a process for using a computational storage device to facilitate hash JOIN when a hash table cannot entirely fit into the memory of the computational storage device according to embodiments.
Figure 5:
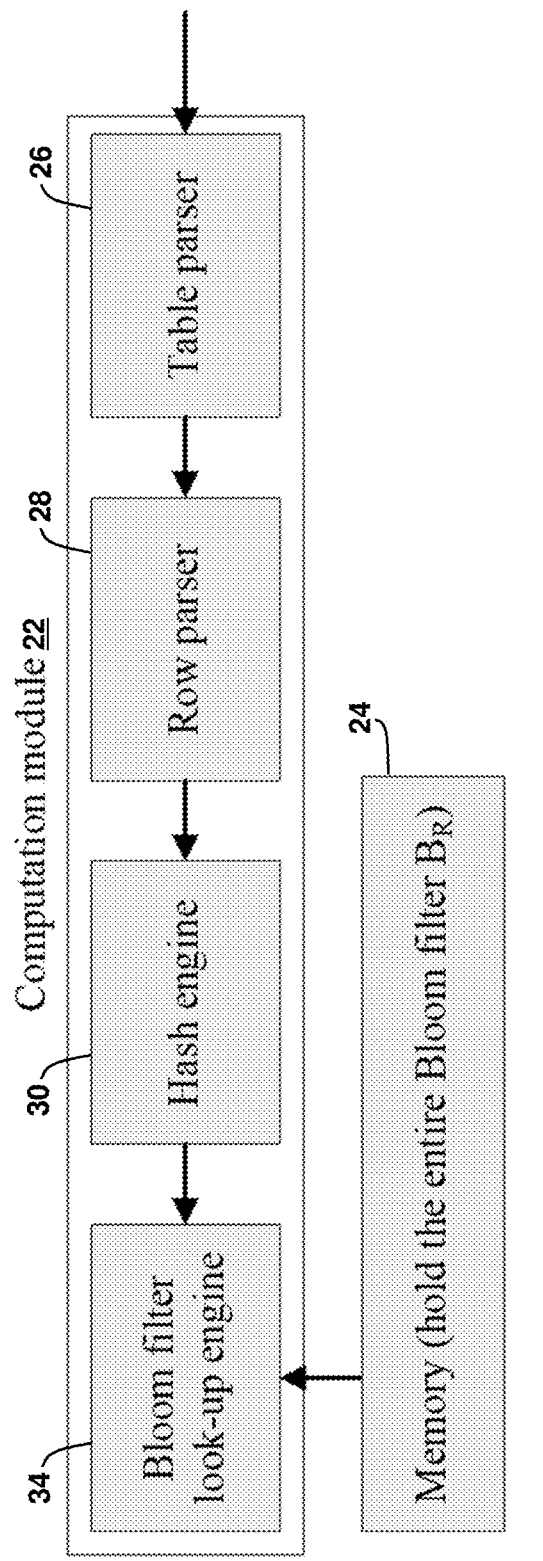
FIG. 5 illustrates a configuration of a computation module of a computational storage device when a hash table cannot entirely fit into the memory of the computational storage device according to embodiments.

FIG. 4 illustrates an operational flow diagram of a process for using the computational storage device 10 to facilitate hash JOIN when a hash table cannot entirely fit into the memory 24 of the computational storage device 10. FIG. 5 shows the corresponding configuration of the computation module 22. FIGS. 1, 4, and 5 will be referred to simultaneously. In the following discussion, it is again assumed that a hash JOIN is to be applied on two tables S and R, that the size of table R is less than the size of table S, and that the host 20 has downloaded the table S to the storage media 12. Further, it is again assumed that the JOIN aims to combine columns based on the $c_s$-th column in table S and $c_r$-th column in table R.

In some cases, due to its limited capacity, the memory 24 of a computational storage device 10 may not be able to hold the entire hash table $H_R$. If the memory 24 is not able to hold the entire hash table $H_R$, it may not be possible to use above presented design solution. To address this issue, the present disclosure presents a two-stage hybrid hash JOIN implementation.

FIG. 4 shows the operational flow diagram. At process B1, a hash table $H_R$ and a Bloom filter $B_R$ of the smaller table R are built using a set of hash functions $F_h$. At process B2, the entire Bloom filter $B_R$ is loaded into the memory 24 of the computational storage device 10. The hash table $H_R$ and the Bloom filter $B_R$ may be built by the host 20, the computational storage device 10, or may be provided in any other suitable manner.

At process B3, the media access module 16 of the device controller 14 fetches the data of table S from the storage media 12, and feeds the data to the computation module 22 of the device controller 14. While receiving data from the media access module 16, at process B4, a table parser 26 of the computation module 22 parses the data to extract each row in the table S. For each row in the table S (Y at process B5), at process B6, a row parser 28 of the computation module 22 extracts the value of the $c_s$-th column from the row, and a hash engine 30 of the computation module 22 applies the set of hash function $F_h$ to the extracted value.

At process B7, a Bloom table look-up engine 34 of the computation module 22 looks up the hash result obtained at process B6 against the Bloom filter $B_R$ stored in the memory 24. In the case of a hit to the Bloom filter $B_R$ (Y at process B8) then the value may likely (but not guaranteed) exist in the smaller table R. In case of a miss to the Bloom filter $B_R$ (N at process B8) then the value does not exist in the smaller table R and can be ignored/discarded. Therefore, using a Bloom filter $B_R$ that can be much smaller than the complete hash table $H_R$, many (but not all) of the entries that will not participate the JOIN operation can be filtered out. To this extent, the computational storage device 10 performs approximate data filtering (e.g., performs a pre-filtering operation).

At process B9, in the case of a hit to the Bloom filter $B_R$ (Y at process B8), the device controller 14 sends the i-th row in the table S plus the row index j in the table R to the host 20. If there are no more rows in the table S (N at process B5), flow passes to process B10. At process B10, upon receiving the table-S rows from the computational storage device 10, the host 20 scans the rows (based upon the hash table $H_R$) to identify all the rows that should participate the JOIN. At process B11, the host 20 combines the columns to finish the JOIN operation.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A method for enhancing a hash JOIN operation, comprising:
   storing an entire hash table of a table R in a memory of a computational storage device;
   storing a second table S in storage media of the computational storage device, wherein the table R is smaller than the table S, and wherein the hash JOIN operation is directed to combining a column of the table S and a column of the table R;
   wherein, for each row of the table S, the computational storage device is configured to perform a method, including:
      applying a hash function to a value of the column of the table S to provide a hash result;
      looking up the hash result in the hash table stored in the memory of the computational storage device; and
      sending, for a match of the hash result in the hash table, the row of the table S and a corresponding row index of the table R to a host computing system.

2. The method according to claim 1, further including, performing, by the host computing system, a hash JOIN based on the rows of the table S and each corresponding row index of the table R received from the computational storage device.

3. The method according to claim 1, wherein, if the hash result is not found in the hash table, discarding the row of the table S.

4. The method according to claim 1, further including building the hash table of the table R by applying the hash function to the table R.

5. The method according to claim 1, wherein the computational storage device is further configured to:
   parse the table S to extract each row of the table S;
   parse each row of the table S to extract the value of the column in the table S.

6. A computational storage device for performing a hash JOIN operation, comprising:
   a memory for storing an entire hash table of a table R;
   storage media for storing a second table S, wherein the table R is smaller than the table S, and wherein the hash JOIN operation is directed to combining a column of the table S and a column of the table R; and
   a processor for performing a method, comprising:
      applying, for each row in the table S, a hash function to a value of the column in the table S to provide a hash result;
      looking up the hash result in the hash table stored in the memory of the computational storage device;
      and
      sending, for a match of the hash result in the hash table, the row of the table S and a corresponding row index of the table R to a host computing system, wherein the host computing system is configured to perform a hash JOIN based on the rows of the table S and each corresponding row index of the table R.

7. The computational storage device according to claim 6, wherein, if the hash result is not found in the hash table, the processor discards the row of the table S.

8. The computational storage device according to claim 6, wherein the method performed by the processor further comprises:
   parsing the table S to extract each row of the table S; and
   parsing each row of the table S to extract the value of the column in the table S.

* * * * *